Dec. 8, 1953  E. J. SCHAEFER  2,662,206
SUBMERSIBLE SUMP PUMP
Filed July 26, 1952  3 Sheets-Sheet 1

INVENTOR.
Edward J. Schaefer,
BY
Davis Lindsey Hibben + Noyes
Atty's.

Dec. 8, 1953     E. J. SCHAEFER     2,662,206
SUBMERSIBLE SUMP PUMP
Filed July 26, 1952     3 Sheets-Sheet 2
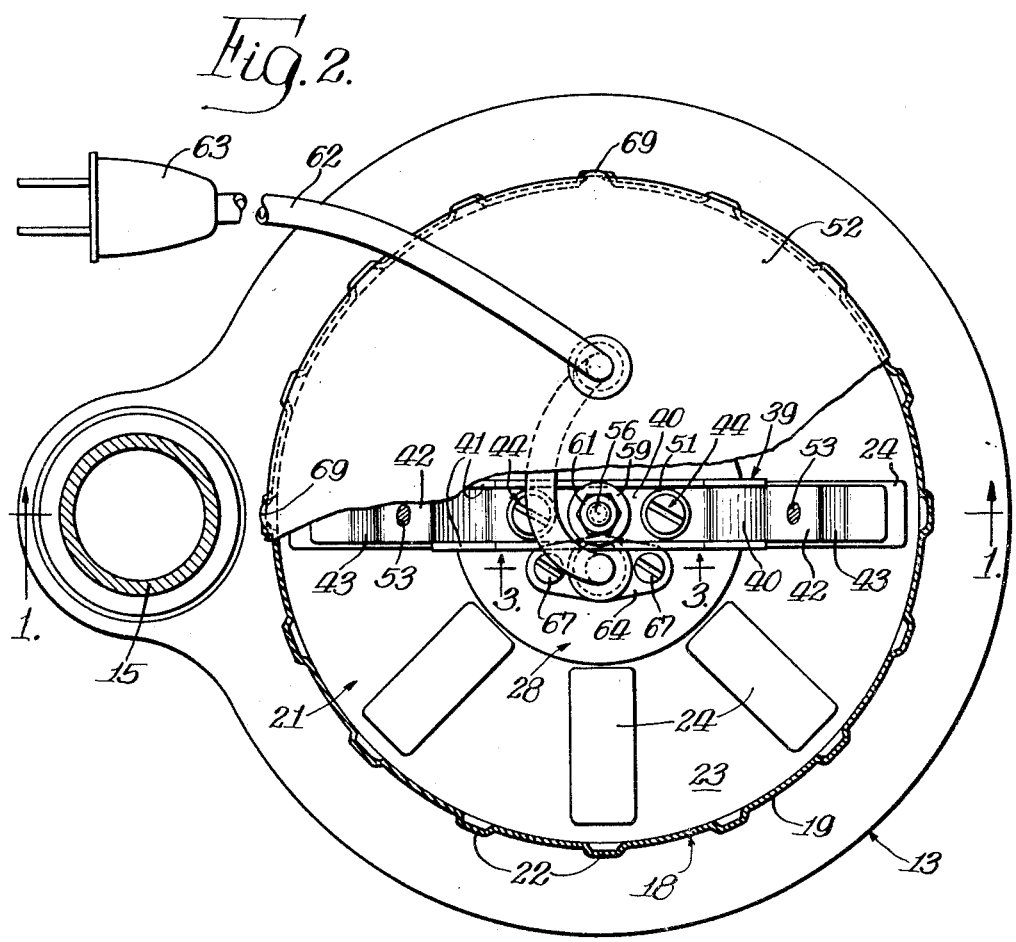
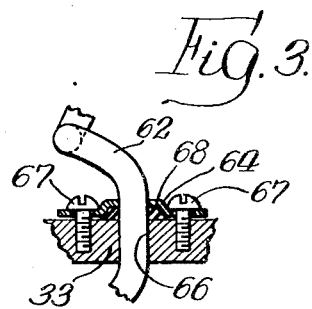
INVENTOR.
Edward J. Schaefer,
BY
Davis Lindsey Hibben & Noyes
Atty's.

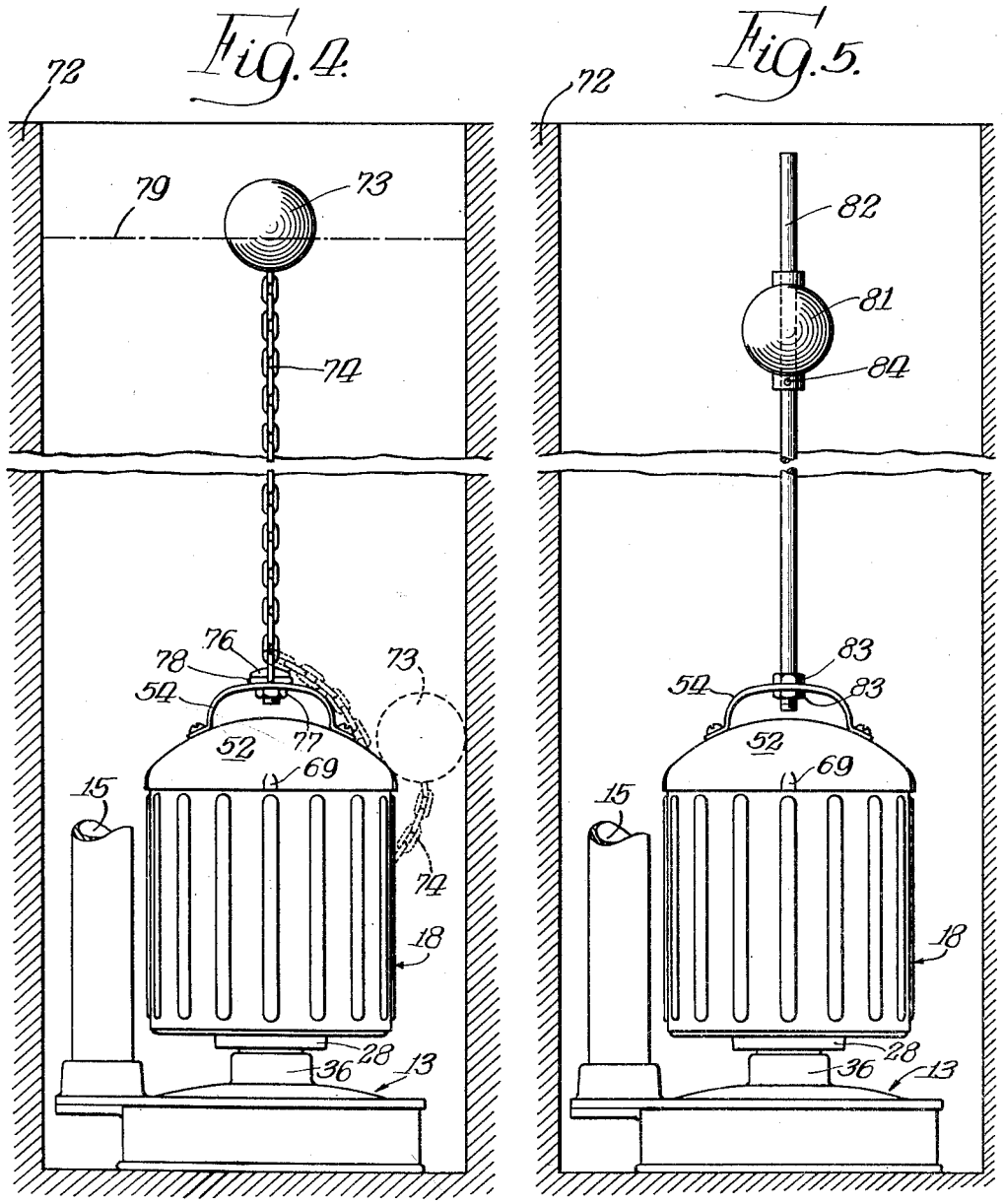

Patented Dec. 8, 1953

2,662,206

UNITED STATES PATENT OFFICE 2,662,206

SUBMERSIBLE SUMP PUMP

Edward J. Schaefer, Fort Wayne, Ind.

Application July 26, 1952, Serial No. 301,144

21 Claims. (Cl. 318—482)

This application is a continuation-in-part of my copending application S. N. 177,674, filed August 4, 1950, now abandoned.

This invention relates generally to sump pumps and more particularly to a novel arrangement of an electric motor and control means for use with sump pumps.

Sump pumps are widely used in homes, office buildings, and the like for the purpose of preventing flooding of basements due to seepage, backwater, inadequate sewer capacity, or other causes. For many years such devices have been made in the same general manner with a centrifugal pump unit adapted to be positioned at the bottom of the sump or pit, an electric motor adapted to be mounted remotely from the pump and preferably near the top of the sump out of all possible contact with water, and an elongated vertical drive shaft connecting the motor with the pump impeller. In order to provide automatic operation, it has also been a common practice to equip such a sump pump arrangement with a float control which operates the motor switch in response to changes of the water level in the sump.

My invention is directed to a simplified and improved sump pump arrangement wherein the electric motor is of the submersible type and may, therefore, be positioned immediately adjacent the pump unit and connected directly thereto. As will hereinafter appear, I also provide a novel and highly advantageous control means for automatically regulating the operation of the submersible motor.

Accordingly, a primary object of the invention is to provide a novel sump pump arrangement characterized by simplicity and compactness of construction and greater ease of installation as compared with the sump pump arrangements heretofore used.

Another object of my invention is to provide a greatly simplified sump pump arrangement wherein the motor is of the submersible type and may, therefore, be mounted closely adjacent the pump unit thereby eliminating the need for an elongated shaft between the motor and the pump impeller.

A further object of the invention is to provide a novel submersible electric motor which is especially adapted for use with a sump pump.

Still another object of the invention is to provide a submersible sump pump motor having enclosure means including also a control means for regulating the operation of the motor in response to changes in water level.

Another object of the invention is to provide a submersible sump mump motor having a combined motor enclosure and float control means.

A still further object of the invention is to provide a submersible sump pump motor having a combined motor enclosure and float control means wherein provision is made to compensate for variations in air temperature and pressure within the motor enclosure.

An additional object of the invention is to provide a novel submersible sump pump in combination with a novel auxiliary control means for permitting operation of the pump at any predetermined liquid level in the sump.

Other objects and advantages of the invention will become apparent from subsequent detailed description of the invention taken in connection with the accompanying drawings wherein:

Fig. 2 is a top plan view of the device shown in Fig. 1 with portions of the structure broken away to reveal the inner construction;

Fig. 3 is a fragmentary sectional view taken along the line 3—3 of Fig. 2;

Fig. 4 is an elevational view on a reduced scale showing the device as used in combination with an auxiliary control means; and Fig. 5 is a view similar to Fig. 4 but showing a different form of the auxiliary control means.

Figure 1:
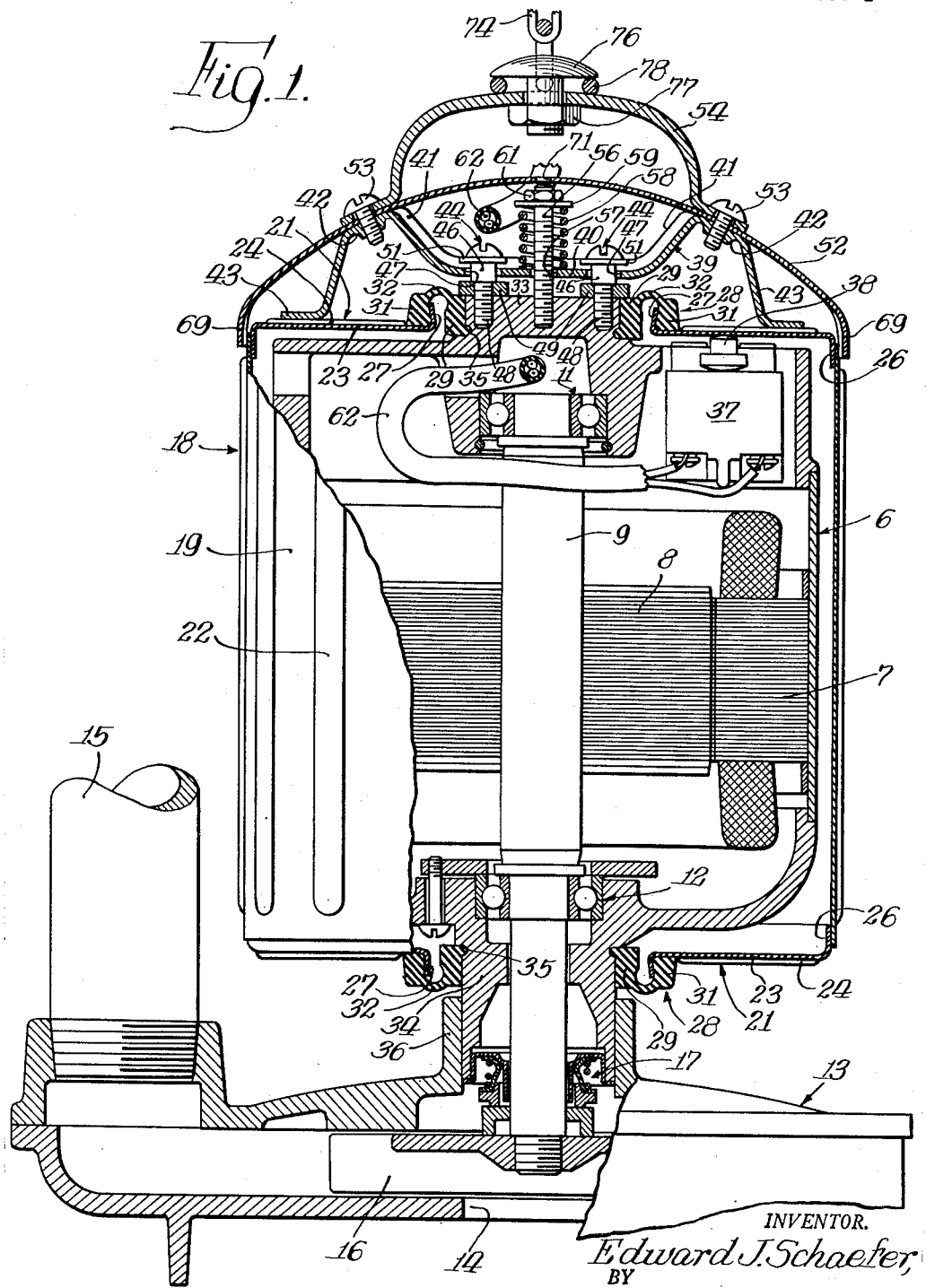
Fig. 1 is a vertical sectional view of a sump pump arrangement comprising one specific embodiment of my invention and taken substantially along the line 1—1 of Fig. 2.

In brief, my invention includes the combination of a sump pump with a submersible electric motor connected directly thereto and mounted in close proximity to the pump unit. In order to protect the motor and render the same submersible I provide an enclosure for the motor including diaphragm means which is deflectable or distortable in response to changes of water level whereby to actuate a control switch for the motor. As will hereinafter appear, in the preferred form of the invention the diaphragm means constitutes an end portion of the motor enclosure. In addition I prefer to arrange the diaphragm means so that the entire motor enclosure functions as a float control.

Referring now to the drawings, wherein one specific embodiment of my invention is shown merely by way of illustration, the device comprises an electric motor 6 of a conventional type having a stator 7 and a rotor 8 with the shaft, indicated at 9, of the rotor journaled in a pair of upper and lower bearings 11 and 12, respectively. Disposed below the motor 6 and immediately adjacent thereto is a centrifugal pump unit 13 of a conventional type having an inlet 14 and an outlet 15 and arranged so that the pump casing supports the weight of the motor. The pump impeller, indicated at 16, is secured at the lower end of the shaft 9 and the latter is provided with a suitable rotating seal 17 to prevent entry of water to the motor through the shaft outlet. The structural details of the motor 6 and the pump unit 13 do not form part of the present invention and accordingly need not be described further.

Surrounding the motor 6 for rendering the latter submersible is an enclosure, indicated generally at 18, which comprises a cylindrical body portion 19 supported on the motor 6 by means of a pair of substantially identical upper and lower end portions designated generally by the reference numeral 21. The body portion 19 is preferably formed from relatively thin corrosion-resistant metal such as stainless steel and is provided with a plurality of longitudinal flutes 22 for stiffening purposes.

Each of the end portions 21 of the enclosure 18 comprises a deflectable diaphragm means including a relatively thin annular element 23 which may be of metal and is provided with outwardly bulged areas, as at 24, for increased stiffness. The outer marginal or peripheral edge of each of the elements 23 is turned inwardly toward the motor 6 to provide a flange or rim 26 which is rigidly secured and sealed, preferably by welding, to the inner periphery of the body portion 19 of the enclosure 18. The inner marginal or peripheral edge of each element 23 is turned outwardly away from the motor 6, as at 27, and is flexibly attached to the motor 6 by means of an annular connecting collar, indicated generally at 28. The collars 28 are preferably formed from a resilient material such as rubber or the like and are generally U-shaped in cross-section, as shown clearly in Fig. 1. Thus, each of the collars 28 is formed with relatively heavy concentric inner and outer ring portions 29 and 31, respectively, which are interconnected adjacent their outermost edges by a relatively thin integral connecting portion 32. The collars 28 are secured to the elements 23 by means of the outwardly turned edges 27 of the latter which are flared outwardly to a slight extent in order to provide a snug engagement with the inner periphery of the collar portions 31. The inner portions 29 of the collars 28 fit snugly around the upper and lower hub portions of the motor 6, as indicated at 33 and 34, respectively, and the inner periphery of each of the collar portions 29 is formed with a circumferential bead 35 which seats tightly in a complementary annular groove in the corresponding motor hub.

Thus, the combination of the enclosure 18 with the upper and lower end portions or diaphragm means 21 forms a water-tight casing which renders the motor 6 submersible and at the same time constitutes a float which is free for limited movement in a vertical direction upon flexing of the connecting portions 32 of the collars 28, as hereinafter described. The lower hub portion 34 of the motor frame is received telescopically within and secured to the shaft inlet, indicated at 36, of the pump casing so that the motor 6 is rigidly supported by the pump casing.

For automatically regulating the operation of the motor 6, a control switch 37 having a depressible spring-pressed operating member or button 38 is mounted adjacent the upper portion of the motor 6 with the operating button 38 facing the upper annular element 23 in operative relation therewith. The switch 37 is of the toggle or snap action type in which a spring normally urges the toggle arrangement toward one of its over-center positions and a substantial force sufficient to overcome the spring pressure is required to effect movement of the toggle to its opposite over-center position. It will be understood that the enclosure 18, which is sealed to the upper and lower ends of the motor 6 by the end diaphragm means 21, will function as a float when the motor and pump unit are disposed at the bottom of a sump. Thus, as the water level in the sump rises, the enclosure 18 containing trapped air is lifted upwardly relative to the motor 6 by the buoyant effect of the water, the flexible connecting portions 32 of the collars 28 permitting this upward movement. Upon upward movement of the enclosure 18, the upper element 23 also moves upwardly and permits the operating button 38 to move outwardly under spring action whereby to complete the electrical circuit for the motor 6 and thereby start the pump 13 in operation. Similarly, as the water level in the sump recedes during operation of the pump 13, the weight of the enclosure 18 causes the latter to move downwardly whereupon the upper element 23 engages the switch button 38 and ultimately the force applied to the button 38 depresses the latter to shut off the motor.

For limiting the extent of vertical movement of the float, a bridge member 39 is provided having a central channel portion 40 with upright sides 41, a pair of attaching portions or humps 42 extending upwardly at opposite ends of the central portion 40, and a pair of depending legs 43 which are attached, as by spot welding, to the bulged portions 24 of the upper element 23. The bridge member 39 is attached to the end hub 33 of the motor 6 by means of a pair of screws 44 each having an enlarged unthreaded shank portion 46 which extends through an enlarged aperture 47 in the bridge and a threaded shank portion 48 of lesser diameter which extends through a spacer block 49 and is secured in the motor hub 33. Vertical movement of the bridge 39 in unison with movement of the float is thus limited in a downward direction by the spacer blocks 49 and in an upward direction by a pair of washers 51 carried adjacent the heads of the screws 44 and fitted between the sides 41 of the channel portion 40. A dome-shaped cover 52 is fastened to the humps 42 of the bridge member 39 by means of a pair of screws 53 with the skirt of the cover fitting over and frictionally engaging the upper end of the body of the enclosure 18. A handle 54 is secured to the exterior of the cover 52 by means of the same screws 53.

In order to provide an adjustment for the operating point of the switch 37, an elongated screw 56 extends through an enlarged aperture 57 in the bridge 39 and is threaded into the end hub 33 of the motor 6. Surrounding the screw 56 is a helical spring 58 bearing at its lower end against the horizontal portion 40 of the bridge and at its upper end against a thrust collar 59 retained on the screw 56 by a nut 61. By selecting a spring of desired predetermined spring rate and by adjustment of the nut 61, it will be seen that the compression of the spring 58, and consequently the force urging the bridge 39 toward the motor 6, can be regulated to vary the force required to lift the enclosure 18. Thus, I can adjust the operating point of the switch button 38 dependent upon the maximum water level desired in the sump. By removing the screws 53 and the handle 54, the cover 52 can be readily detached from the enclosure 18 to permit easy access to the spring adjustment.

An electric conductor 62 extends from a connecting plug 63 through the dome-shaped cover 52 and downwardly through the upper hub portion 33 of the motor to the switch 37. In order to form a water-tight seal at the point through which the conductor 62 enters the hub portion 33 of the motor, the arrangement shown in detail in Fig. 3 is provided. The conductor 62 extends downwardly through a seal or packing gland 64 and an aperture 66 in the hub 33, the gland 64 being adjustably secured to the hub 33 by means of a pair of screws 67. A flexible sealing ring 68 of rubber or the like is clamped between the gland 64 and the hub 33 and surrounds the conductor 62. Upon tightening of the screws 67, it will be seen that the rubber ring 68 will be compressed between the gland 64 and hub 33 with the result that it tightly embraces and seals the conductor 62 at its point of entry into the hub 33.

An important feature of the invention resides in the provision of the substantially identical upper and lower diaphragm means 21 comprising the annular elements 23 and the flexible collars 28. Inasmuch as air is trapped within the enclosure 18, it will be apparent that the pressure within the enclosure may vary with the temperature of the air contained therein. Thus, as the motor 6 heats up during operation the temperature of the air inside of the enclosure 18 may vary as much as 50° C. Under such circumstances it is necessary to compensate for varying air pressure in order to avoid the possibility that an increase in air pressure inside the enclosure might cause movement of the enclosure relative to the motor and thereby effect the operation of the device independently of any change of water level. According to my invention, the use of the substantially identical diaphragm means 21, i. e. diaphragm means having substantially the same exposed areas, at the top and bottom of the cylindrical portion 19 of the enclosure 18 balances out the effect of varying air pressure within the enclosure and leaves the upward and downward movement of the enclosure 18 dependent solely upon water level. In other words, in the embodiment of the invention shown in Fig. 1, even if the pressure of the air surrounding the motor 6 and within the enclosure 18 should increase, the net force tending to move the enclosure 18 relative to the motor 6 will be zero because the force acting against the upper diaphragm means 21 tending to move the enclosure 18 upwardly will be counteracted by a substantially identical force acting upon the lower diaphragm means 21 tending to move the enclosure 18 downwardly.

As a result of the compact unitary construction of my device, the entire apparatus may be lowered by means of the handle 54 and positioned at the bottom of a sump. As the water level in the sump rises, the enclosure 18 protects the motor 6 against water and at the same time functions as a float control to actuate the motor switch 37 at a desired predetermined water level. Inasmuch as the cover 52 is not attached to the enclosure 18 in a waterproof manner, such waterproof relation being unnecessary to protect the motor 6, I provide a plurality of louvres 69 at the skirt of the cover 52 and an air aperture 71 at the top of the cover 52 in order to permit water to drain readily from within the cover after submersion thereof. In addition, the louvres 69 and the aperture 71 in the cover 52 serve to vent the space enclosed by the cover to the atmosphere during normal operation of the device. It will be understood that although the effect of variations in pressure of the air trapped within the enclosure 18 is compensated for by the provision of upper and lower diaphragm means 21 having substantially equal internal areas, such a balanced condition would not exist with respect to variations of air pressure within the space between the cover 52 and the upper diaphragm means 21. Obviously, the inner exposed area of the dome-shaped cover 52 is greater than the effective annular area of the upper diaphragm means 21 surrounding the hub 33 with the result that if the cover 52 were not vented to the atmosphere, variations in air pressure in the space under the cover 52 might exert an unbalanced effect on the enclosure 18 causing the latter to move independently of any change in water level.

Referring now to Figs. 4 and 5, I have illustrated therein an auxiliary control means used in combination with the sump pump hereinbefore described for the purpose of making major changes in the operating differential of the device.

With the structure illustrated in Figs. 1 to 3 as thus far described, it will be understood that for a sump pump of any given size the upper and lower liquid levels in the sump at which the pump starts and stops operating are limited to a maximum differential dependent largely upon the size and weight of the float or enclosure 18. Some variation in this differential within the limits of the height of the float 18 is possible by altering the weight of the float or by adjustment of the spring 58. For example, small weights can be secured to the cover portion 52, or the spring 58 can be substantially compressed or even replaced with a stronger spring. However, such adjustments of operating differential are limited in each case by the height of the float 18 since it will be apparent that once the level in the sump reaches the top of the float 18, any further increases in sump level will not increase the buoyant effect on the float 18.

It may happen in certain uses of the device that it would be desirable to increase this operating differential. For example, a unit would ordinarily be adjusted before leaving the factory to operate at the maximum differential, e. g. 4", which could be permitted with proper allowance of a suitable safety factor. However, if the pump is used in a rather small diameter sump and with a rather steady inflow of water to the sump, it might be desirable to increase the differential range in order to avoid very frequent starting and stopping of the pump. For example, it might be desirable to adjust the device so that a level change of 12" or 24" would be required before the pump starts or stops. To accomplish the latter purpose, I employ an auxiliary float means which can be readily attached to the unit illustrated in Figs. 1 to 3 whenever such use is indicated.

In Fig. 4, the sump pump unit as hereinbefore described is shown in position at the bottom of a sump 72 having a relatively small diameter. The auxiliary control means is in the form of a ball float 73 attached to a length of light weight chain 74 which is in turn secured to the handle 52 of the sump pump by means of a screw 76 and a nut 77. The handle 54 is provided with a suitable aperture to receive the screw 76 and the latter is simply inserted through one of the links, indicated at 78, of the chain (Fig. 1). During use of the ball float, the normal operation of the float 18 is prevented by adding suitable weights to the cover 52 or by adjustment or replacement of the spring 58. By this means the maximum buoyant effect of the water in the sump is rendered insufficient to effect upward movement of the float 18 and consequent actuation of the switch 37. Prior to the time the liquid level reaches the top of the float 18, the ball float 73 is also inoperative and is supported between the cover 52 and the adjacent wall of the sump 72 as indicated in dotted lines in Fig. 4. The diameter of the ball float 73 is preferably large enough so that it does not become wedged or caught between the sump pump and the wall of the sump. As the liquid level in the sump rises above the top of the float enclosure 18, the ball float 73 also rises on the surface of the liquid and carries with it the chain 73. Finally, when the chain 74 is in completely taut condition, as shown in solid lines in Fig. 4, the buoyant effect of the ball float 73 augments the buoyant effect of the float enclosure 18 and a predetermined further increase in liquid level, indicated at 79, will exert sufficient buoyant effect on the ball float 73 to lift the float enclosure 18 and thereby actuate the switch 37 to start the pump. Thus, the upper limit of operating liquid level in the sump can be increased to any desired point merely by selecting the proper length for the chain 74, or with a given length of chain a similar adjustment can be obtained by inserting the screw 76 through different links of the chain.

If desired, the sump pump unit may be equipped with an additional auxiliary control means, forming no part of the present invention, which will insure operation of the pump until the sump is substantially dry. One form of such additional control means is shown in my copending application Ser. No. 211,544, filed February 17, 1951.

In Fig. 5 a slightly different modification of the auxiliary control is shown wherein a ball float 81 is slidably mounted on an upright rod 82 which is affixed to the handle 54 of the sump pump by means of a pair of nuts 83. The float 81 is slidable along the rod 82 and can be secured in any desired elevation thereon by means of a set screw 84. The operation of this form of auxiliary control is generally similar to that shown in Fig. 4 and need not be described in further detail. Variation in the effective upper limit of liquid level in the sump may be obtained by adjustment of the ball float 81 along the rod 82. Also, in this form of the device, it will be seen that the total weight of the ball float 81 and its supporting rod 82 is supported by the float enclosure 18 of the sump pump when the liquid level is below the top of the latter, and in many cases this additional weight will be adequate to prevent normal operation of the switch 37 due to the buoyancy of the float 18 alone.

Although the invention has been described in connection with certain specific structural embodiments thereof, it will be understood that various modifications and equivalent structures may be resorted to without departing from the scope of the invention as defined in the appended claims.

I claim:

1. In a motor driven sump pump, an electric motor, a hollow float chamber surrounding said motor to render the same submersible, said float chamber being supported on said motor for limited movement relative thereto, and a control switch for said motor within said float chamber, said control switch being adapted to be actuated upon movement of said float chamber in response to changes in liquid level outside said float chamber.

2. In a motor driven sump pump, an electric motor, an enclosure surrounding said motor to render the same submersible, a control switch for said motor within said enclosure, and attaching means flexibly sealing said enclosure to said motor in movable relation therewith whereby said enclosure also comprises a float chamber movable in response to changes in liquid level outside said float chamber, said control switch being actuated upon movement of said float chamber for regulating the operation of the motor.

3. In a motor driven sump pump, an electric motor, a cylindrical enclosure surrounding said motor, diaphragm means secured at opposite ends of said enclosure to provide end closures for the same, said diaphragm means having flexible attaching portions securing said diaphragm means to the opposite ends of the motor in movable relation thereto, and a control switch for said motor mounted within said enclosure adjacent said diaphragm means and adapted to be actuated upon flexing movement of said diaphragm means in response to changes in liquid level outside said enclosure.

4. In a motor driven sump pump, an electric motor, a control switch for said motor, and an enclosure surrounding said motor and control switch for rendering the same submersible, said enclosure comprising a cylindrical body portion around said motor, a pair of annular elements secured to said body portion at the opposite ends thereof, and flexible collar means secured to said annular elements and to the opposite ends of said motor whereby said enclosure is supported on said motor for limited movement relative thereto, said control switch having an operating member disposed adjacent one of said annular elements and engageable therewith for actuating said switch upon movement of said enclosure relative to said motor in response to changes in liquid level outside said enclosure.

5. In a motor driven sump pump, an electric motor, a control switch for said motor, and an enclosure surrounding said motor and control switch for rendering the same submersible, said enclosure comprising a cylindrical body portion around said motor, a pair of annular elements each secured at its outer periphery to one end of said body portion and having an outwardly bent rim portion at its inner periphery, and a pair of flexible collars each comprising inner and outer concentric rings integrally connected by a relatively thin flexible connecting portion, the inner ring of each of said collars fitting snugly around an end portion of the motor and the outer ring thereof tightly engaging the rim portion of the corresponding annular element whereby said enclosure is supported on the motor for limited movement relative thereto, said control switch having an operating member disposed adjacent one of said annular elements and engageable therewith for actuating said switch in response to changes in liquid level outside said enclosure.

6. In a motor driven sump pump, an electric motor having hub portions at the opposite ends thereof, a control switch for said motor, and an enclosure around said motor and switch for rendering the same submersible, said enclosure comprising a cylindrical body surrounding the motor and provided with annular end portions at its opposite ends, and flexible connectors between said annular end portions and said motor, said connectors comprising resilient annular members of generally U-shaped cross-section having inner portions fitting snugly around the hub portions of the motor and concentric outer portions flexibly connected to said inner portions and engaging said annular end portions, and said control switch being disposed adjacent one of said annular end portions for actuation by the latter upon movement of said enclosure in response to changes in liquid level outside said enclosure.

7. In a motor driven sump pump, an electric motor, a control switch for said motor, an enclosure surrounding said motor and switch to render the same submersible, said enclosure being flexibly supported adjacent the ends of the motor for limited movement relative thereto and said switch having an operating member engageable with one end of said enclosure for actuating said switch in response to changes in liquid level outside said enclosure, and spring means mounted outside said enclosure and coacting with the latter for determining the liquid level at which said switch is actuated.

8. In a motor driven sump pump, an electric motor, a waterproof enclosure around said motor supported thereon for movement relative thereto, a control switch for said motor mounted within said enclosure adjacent an end portion thereof, said switch having a depressible operating member engageable by said end portion of said enclosure for actuating the switch upon movement of said enclosure in response to changes in liquid level outside said enclosure, spring means outside said enclosure coacting with said end portion thereof for normally urging said end portion into engagement with said operating member, and adjusting means operatively associated with said spring means for controlling the spring tension whereby to determine the liquid level at which said switch is actuated.

9. In a motor drive sump pump, an electric motor, a waterproof enclosure around said motor supported thereon for movement relative thereto, a control switch for said motor mounted within said enclosure adjacent an end portion thereof, said switch having a depressible operating member engageable by said end portion of said enclosure for actuating the switch upon movement of said enclosure in response to changes in liquid level outside said enclosure, a screw extending from the end of said motor exteriorly of said enclosure and adjacent said one end portion thereof, a coil spring carried on said screw in operative engagement at one end thereof with said one end portion of said enclosure, and adjustable retaining means on said screw at the opposite end of said spring for determining the liquid level at which said switch is actuated.

10. In a motor driven sump pump, an electric motor, a waterproof enclosure around said motor supported thereon for upward and downward movement relative thereto in response to changes in liquid level outside said enclosure, a control switch for said motor mounted within said enclosure and adapted to be actuated by said enclosure upon said movement thereof, and abutment means coacting with said enclosure for limiting the extent of upward and downward movement thereof.

11. In a motor driven sump pump, an electric motor having hub portions at the upper and lower ends thereof, a waterproof enclosure around said motor and flexibly secured to said hub portions for upward and downward movement relative to said motor in response to changes in liquid level outside said enclosure, a control switch for said motor mounted within said enclosure and adapted to be actuated by said enclosure upon said movement thereof, a bridge member extending across the upper hub portion of the motor outside said enclosure and secured to said enclosure at opposite sides of said upper hub portion, and retainer means extending through said bridge member into said upper hub portion for limiting the extent of movement of said enclosure relative to said motor.

12. In a motor driven sump pump, an electric motor having hub portions at the upper and lower ends thereof, a waterproof enclosure around said motor and flexibly secured to said hub portions for upward and downward movement relative to said motor in response to changes in liquid level outside said enclosure, a control switch for said motor mounted within said enclosure and adapted to be actuated by said enclosure upon said movement thereof, a bridge structure rigidly secured to said enclosure across the upper end thereof in spaced relation from the adjacent motor hub, retainer means coacting with said bridge structure and said adjacent motor hub for limiting the extent of movement of said enclosure relative to the motor, and adjustable spring means coacting with said bridge structure for normally urging the latter toward the motor whereby to provide regulation of the operating point of said switch.

13. In a motor driven sump pump, an electric motor having upper and lower hub portions, a waterproof enclosure around said motor for rendering the same submersible, said enclosure having annular end portions flexibly attached to the hub portions of said motor for upward and downward movement of said enclosure relative to said motor in response to changes in liquid level outside said enclosure, a control switch for said motor mounted within said enclosure adjacent the upper annular end portion thereof and having an operating member adapted to be actuated by said upper annular end portion upon said movement of said enclosure, bridge means rigidly secured to the upper annular end portion of said enclosure at the outside thereof and extending across the upper hub portion of the motor in spaced relation therefrom, retainer means coacting with said bridge means and said upper hub portion for limiting the extent of said upward and downward movement, and adjustable spring means engaging said bridge means and normally urging the latter toward said motor for regulating the operating point of said switch.

14. In a motor driven sump pump, an electric motor, a waterproof enclosure surrounding said motor to render the same submersible, said enclosure being flexibly supported on said motor for movement relative thereto, a control switch for said motor adapted to be actuated by said enclosure upon movement thereof in response to changes in liquid level outside said enclosure, bridge means secured to the outside of said enclosure at the upper end thereof, a cover secured to said bridge means and engaging said enclosure, said cover being vented to the atmosphere and having outlet means for drainage of liquid therefrom, and a handle secured to said cover and bridge means.

15. In a motor driven sump pump, a motor having a frame provided with a shaft-supporting hub at its lower end adapted to fit in telescopic relation with a pump casing for support thereby, said motor having a shaft extending through said hub and adapted to extend into the pump, a motor control switch, and an enclosure for said motor adapted to be submerged in water in the sump and including a diaphragm secured to said hub and responsive to variations in water level to actuate said switch.

16. In a motor driven sump pump, a motor having a frame provided with a shaft-supporting hub at its lower end adapted to fit in telescopic relation with a pump casing for support thereby, said motor having a shaft extending through said hub and adapted to extend into the pump, a motor control switch, and a watertight enclosure for said motor and switch and adapted to be submerged in water in the sump, said enclosure constituting a float movable relative to the motor to actuate said switch by variations in water level and including a diaphragm secured to said hub.

17. In a motor driven sump pump, an electric motor, a control switch for said motor, a casing structure around said motor to render the same submersible whereby to permit said motor to be disposed at the bottom of a sump adjacent a pump unit, said casing structure including movable diaphragm means mounted adjacent said control switch and responsive to changes in liquid level in the sump for actuating said control switch, and spring means operatively coacting with said diaphragm means for determining the liquid level at which said switch is actuated.

18. In combination, a motor driven sump pump including an electric motor, a hollow float chamber surrounding the motor for rendering the same submersible, and a control switch for the motor within said float chamber, said float chamber being supported on said motor for limited movement relative thereto and said control switch being adapted to be actuated upon movement of said float chamber in response to changes in liquid level outside said float chamber, and auxiliary float control means comprising a second float member separate from said float chamber, and elongated connecting means secured to said float member and to said float chamber whereby said float member becomes effective in augmenting the buoyant effect of said float chamber at a predetermined liquid level above the float chamber.

19. In combination, a motor driven sump pump including an electric motor, a hollow float chamber surrounding the motor for rendering the same submersible, and a control switch for the motor within said float chamber, said float chamber being supported on said motor for limited movement relative thereto and said control switch being adapted to be actuated upon movement of said float chamber in response to changes in liquid level outside said float chamber, and auxiliary float control means comprising a second float member separate from said float chamber, and elongated connecting means secured to said float member and detachably securable to said float chamber whereby said float member is adapted to augment the buoyant effect of said float chamber at a predetermined liquid level above the float chamber for varying the upper limit of operating liquid level in the sump.

20. In combination, a motor driven sump pump including an electric motor, a hollow float chamber surrounding the motor for rendering the same submersible, and a control switch for the motor within said float chamber, said float chamber being supported on said motor for limited movement relative thereto and said control switch being adapted to be actuated upon movement of said float chamber in response to changes in liquid level outside said float chamber, and auxiliary float control means comprising a second float member separate from said float chamber, and an elongated flexible non-rigid connector secured to said second float member and adapted to be detachably secured to said float chamber for augmenting the buoyant effect of the latter, said connector having a predetermined length for permitting the second float member to become effective at a predetermined liquid level above the float chamber.

21. In combination, a motor driven sump pump including an electric motor, a hollow float chamber surrounding the motor for rendering the same submersible, and a control switch for the motor within said float chamber, said float chamber being supported on said motor for limited movement relative thereto and said control switch being adapted to be actuated upon movement of said float chamber in response to changes in liquid level outside said float chamber, and auxiliary float control means comprising a second float member separate from said float chamber, and an elongated rigid rod carrying said float member and adapted to be detachably secured in a generally upright manner to the top of said float chamber for augmenting the buoyant effect of the latter, said float member being adjustable along said rod for permitting the float member to become effective at a predetermined liquid level above the float chamber.

EDWARD J. SCHAEFER.

References Cited in the file of this patent
UNITED STATES PATENTS

| Number | Name | Date |
|---|---|---|
| 1,879,628 | Mendenhall et al. | Sept. 27, 1932 |
| 2,002,913 | Mendenhall | May 28, 1935 |
| 2,002,916 | Mendenhall | May 28, 1935 |
| 2,424,657 | Goodman | July 29, 1947 |